Sept. 20, 1938.  R. CHILTON  2,130,379
ANTIFRICTION BEARING
Filed June 2, 1937
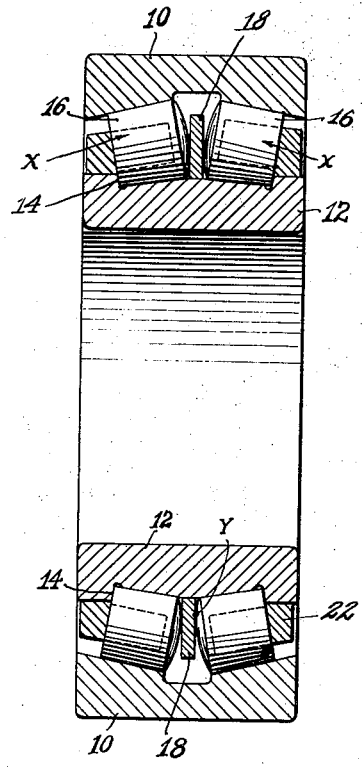
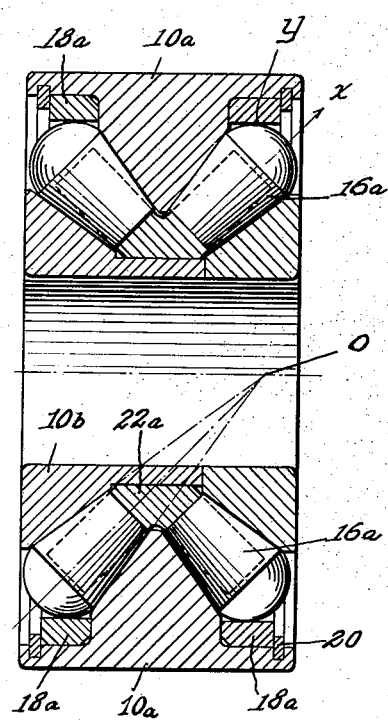
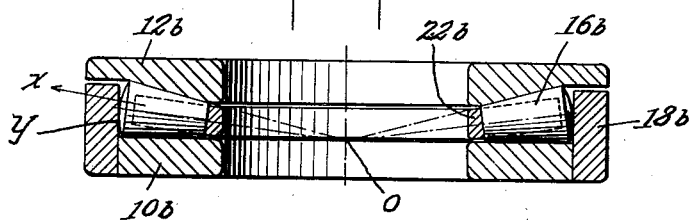
INVENTOR
ROLAND CHILTON
BY
ATTORNEY Patented Sept. 20, 1938

2,130,379

UNITED STATES PATENT OFFICE 2,130,379

ANTIFRICTION BEARING

Roland Chilton, Ridgewood, N. J.

Application June 2, 1937, Serial No. 145,946

12 Claims. (Cl. 308—214)

This invention relates to anti-friction bearings, and more particularly to new and improved roller thrust means for tapered roller bearings.

Conventional bearings comprise a pair of members having raceways, coned to conform to conical rollers having a common cone apex on the axis of rotation of the race members. Such rollers are subject not only to centrifugal thrust but to large thrust loads due to their conical formation, which loads are conventionally resisted by shoulders rigid with one of the race members. In one known type, the ends of the rollers are formed as spherical elements contacting the shoulder or abutment on the raceway. This contact cannot occur at the extreme circumference of the roller, but must be radially inward thereof and, accordingly, the thrust contact is out of line with the conic surface of the roller, whereby sliding, as well as spinning action occurs because the velocity at the contact point is different from the velocity at the coned roller-to-race contact. This substantial amount of sliding causes wear and friction when the roller ends abut conventional thrust shoulders rigid with a race member.

According to the present invention, the abutment elements are organized to float rotationally with respect to the associated race member and the thrust ring element is free to assume the velocity of the point of roller contact, whereby all sliding or translational friction is avoided and the action becomes one of spinning upon the contact point.

Other objects and advantages of the invention will be pointed out in, or will be obvious from, the following description with reference to the drawing, in which similar numbers indicate similar parts, and in which:

Fig. 1 is an axial section through a two-row radial bearing incorporating the invention;

Fig. 2 is an axial section of a bearing having relatively great angle of roller axis inclination, suitable for combined thrust and radial loads, and Fig. 3 is an axial section through a thrust bearing embodiment.

Referring first to Fig. 1, 10 designates an outer race and 12 an inner race member which latter may have shoulders 14. The outer and inner races are formed with double opposed conical raceways and between these are rollably engaged correspondingly conical rollers 16. These rollers, due to their conicity, develop thrust reactions urging them in the direction indicated by the arrows "X".

The structure so far described is conventional and an essential provision of the present invention resides in a thrust ring 18 which, in this embodiment, is interposed between the rollers. In conventional construction, this thrust ring is made integral with the associated race 12 whereas, according to the present invention, the ring is freely rotatable relative to the race so that it may be carried around the race at the speed of the contacting points of the rollers whereby the sliding action characteristic of the integral race shoulder is eliminated.

In Fig. 1, the ends of the roller are shown sphericalized, the radius of the sphere being such that its contact with the ring 18 is away from the roller corners or periphery as indicated by the point "Y". Considering the rollers in their planetary movement around the race 12, it will be obvious that the point "Y" has a positive velocity relative to the race and would therefore scrub or slide over the ring 18 if this element were fixed to the race, whereas by floating the abutment ring 18, it is free to assume the velocity of the contact point "Y" of each roller and thus to be carried around by the rollers without any sliding component.

It will be noted that the sphericalized end elements of the rollers have been so proportioned that the tangents to contact point are normal to the axis of rotation of the bearing, wherefore the ring 18 is parallel sided. Non-rectangular location of the contact points on the sphericalized ends of the rollers would require a nonparallel or wedge-form ring. With a parallel sided ring, it is obvious that there are no reactions tending to displace the ring radially, that is to say, no loads devolve upon the running contact between the ring and the associated race. With a wedge-form ring, this is also true when the bearing is subject to axial or thrust loads, but in this particular case when the bearing is subject to radial loads, whereby only part of the total number of rollers are loaded at any one time, the thrust reactions would produce some slight radial load tending to displace the thrust ring, which loads would be taken by the free running fit of the ring over the associated race.

In Fig. 2 there is shown a modification comprising an outer race 10a and an inner race 10b which, for assembly reasons, may be made in two parts as shown. It will be seen that these races have relatively steeply coned track surfaces conformed to rollers 16a, the cones of which intersect on the axis of bearing rotation, as indicated at "O". In this case, two floating thrust rings 18a are required and these are freely rotatable relative to the raceway 10a; being conveniently located therein by means of snap rings 20. The thrust rings 18a have their inner surfaces cylindrical, that is to say, diametrically opposed sections are parallel to each other and these parallel surfaces are engaged by sphericalized ends on the rollers at the point "Y" which again obviously has a positive velocity relative to the associated raceway 10a, and again, due to the free floating support of the rings 18a, these will automatically assume this velocity in defeat of sliding which would occur should the roller thrust surface be integral with the associated race member as in conventional practice.

Moreover, in this embodiment there is no radial action on the thrust rings 18a when all the rollers are equally loaded as when the bearing is subject to thrust load only, but there will be such reactions when the bearing is under radial load, and these reactions devolve upon the running fit between the ring 18a and the associated race member 10a.

In Fig. 3 there is shown a bearing intended for thrust loads only. This bearing comprises a flat lower race 10b, and a coned upper race 12b conformed to the cone angle of rollers 16b, the apex of which is on the axis "O" of bearing rotation as usual. In this case the floating roller thrust ring 18b freely encircles the race 10b and is contacted by the sphericalized roller ends at "Y"; again being free to spin at the velocity of these contact points to the defeat of sliding.

It is pointed out that in all three alternative showings the floating thrust rings have opposed elements on their roller contacting faces parallel to each other, resulting in the plane surfaced ring 18 of Fig. 1 and in the parallel cylindrically surfaced rings 18a and 18b of Figs. 2 and 3, respectively. This provision eliminates the possibility of unbalanced radial reactions in the case of the flat type ring of Fig. 1 and similarly eliminates the possibility of any axial reaction in case of the parallel cylindrical rings of Figs. 2 and 3. Accordingly, this parallel formation of the working surface of the floating thrust rings is one of the features of the invention.

In all the embodiments, a suitable cage or spacer 22, 22a, or 22b is preferably provided.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An anti-friction bearing comprising conical rollers, a pair of members having races conformed to said rollers, spherical thrust elements formed on the ends of said rollers, and a ring engaging said thrust elements intermediate the center and circumference thereof and freely rotatable with respect to said races.

2. An anti-friction bearing including, in combination, conical rollers having sphericalized thrust surfaces at one end of each thereof, a ring having a point of engagement with each roller thrust surface intermediate the center and circumference thereof, and a pair of members having races rollably engaging said rollers and rotationally free of said thrust ring.

3. In an anti-friction bearing, conical rollers, conical races, a roller thrust ring comprising a thrust abutment engaging a point on the end of each roller intermediate the center and circumference thereof, and means whereby said abutment may rotate freely relative to said race members so as to assume the speed of the points on the rollers which the thrust ring contacts.

4. In an anti-friction bearing, conical rollers having sphericalized ends, conical races, a roller thrust ring comprising a thrust abutment engaging a point on the end of each roller, and means whereby said abutment may rotate freely relative to said race members so as to assume the speed of the points on the rollers which the thrust ring contacts, the roller engaging surface of said ring being arranged on a rectangular coordinate with respect to the axis of rotation.

5. In an anti-friction bearing, conical rollers each having a sphericalized end, conical races, a roller thrust ring comprising a thrust abutment engaging a point on the end of each roller, and means whereby said abutment may rotate freely relative to said race members so as to assume the speed of the points on the rollers which the thrust ring contacts, said ring having its plane of rotation, axis of rotation, and its roller contacting surface arranged on rectangular coordinates.

6. In an anti-friction bearing, conical rollers each having a sphericalized end, conical races, a roller thrust ring comprising a thrust abutment engaging a point on the end of each roller, and means whereby said abutment may rotate freely relative to said race members so as to assume the speed of the points on the rollers which the thrust ring contacts, the surface contours of said ring at the several roller contacts being parallel to each other.

7. In an anti-friction bearing, conical rollers each having a sphericalized end, conical races, a roller thrust ring comprising a thrust abutment engaging a point on the end of each roller, and means whereby said abutment may rotate freely relative to said race members so as to assume the speed of the points on the rollers which the thrust ring contacts, the roller contacting surface of said ring being parallel to its rotation axis.

8. An anti-friction bearing including conical rollers and races, a sphericalized end on each roller, and a thrust ring engaging a point on each sphericalized end intermediate its center and circumference.

9. In an anti-friction bearing, conical rollers each having a sphericalized end, conical races, a roller thrust ring comprising a thrust abutment engaging a point on the end of each roller, and means whereby said abutment may rotate freely relative to said race members so as to assume the speed of the points on the rollers which the thrust ring contacts, the roller contacting surface of said ring being parallel to its plane of rotation.

10. In combination, members having axially opposed race faces, rollers in anti-friction cooperation with said faces and having sphericalized outer ends, and a ring embracing said rollers in rolling contact with said sphericalized ends intermediate the circumference and center thereof, said ring being rotatable relative to said members.

11. In an anti-friction bearing, annular members having axially opposed raceways, spherically ended rollers anti-frictionally supporting one member from the other, and a ring rotatable relative to said members, said ring having a substantially cylindrical bore engaging said ends intermediate the center and circumference thereof.

12. An anti-friction bearing including cooperating rollers and races, a sphericalized end on each roller, and a thrust ring embracing the rollers and engaging a point on each sphericalized end intermediate its center and circumference.

ROLAND CHILTON.